No. 742,861. PATENTED NOV. 3, 1903.
J. H. HALLBERG.
SYSTEM OF ELECTRICAL DISTRIBUTION.
APPLICATION FILED FEB. 20, 1903.
NO MODEL.

WITNESSES:
E. Pearson
Frank O'Connor

INVENTOR
J. H. Hallberg
BY Geo. H. Benjamin
ATTORNEY

No. 742,861.                                              Patented November 3, 1903.

UNITED STATES PATENT OFFICE.

JOSEF HENRIK HALLBERG, OF NEW YORK, N. Y.

SYSTEM OF ELECTRICAL DISTRIBUTION.

SPECIFICATION forming part of Letters Patent No. 742,861, dated November 3, 1903.

Application filed February 20, 1903. Serial No. 144,275. (No model.)

*To all whom it may concern:*

Be it known that I, JOSEF HENRIK HALLBERG, a citizen of the United States, residing at New York city, county and State of New York, have invented a System of Electrical Distribution, of which the following is a specification.

My invention has especial reference to the automatic regulation of the current-generating devices used in systems of electrical distribution.

My improved system may be employed for distributing heat, light, or power.

My invention depends upon the observed fact that the speed of a motor-armature, where the armature is fed from a constant-potential source, can be increased or diminished within certain defined limits by inversely varying the current traversing the field-magnets of such motor.

Considered broadly, my invention may be said to consist in a system of electrical distribution wherein the current traversing and exciting the field-magnets of the main generator or main generators is automatically varied to maintain a uniform potential in the distributing-circuit by varying, in accordance with the work in the distributing-circuit, the speed of a small motor driving a small generator which furnishes either the whole or a portion of the required current to excite the field-magnets of the main generator or generators of the system.

The object of my invention is to dispense with the use of compound windings on the field-magnets of the main generator or generators, as also the employment of complicated rheostats or other regulating devices, and generally to decrease the operating cost and increase the efficiency of the system.

The accompanying diagrams will serve to illustrate my invention, in which—

Figure 1:
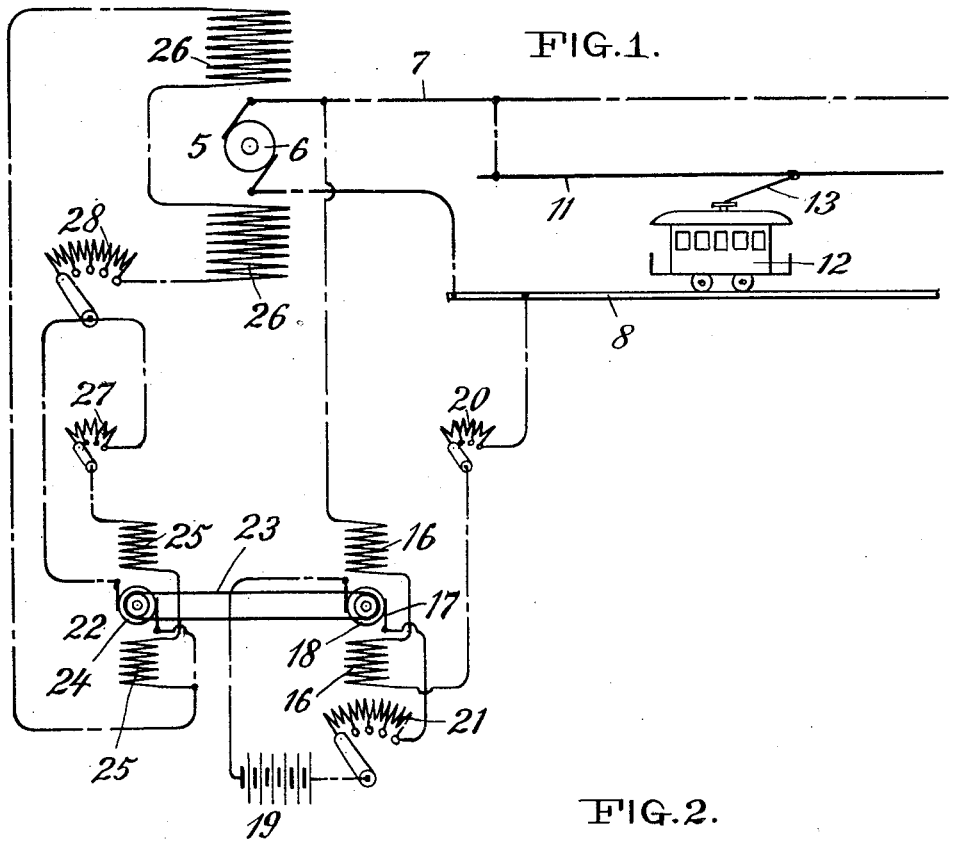
Figure 2:
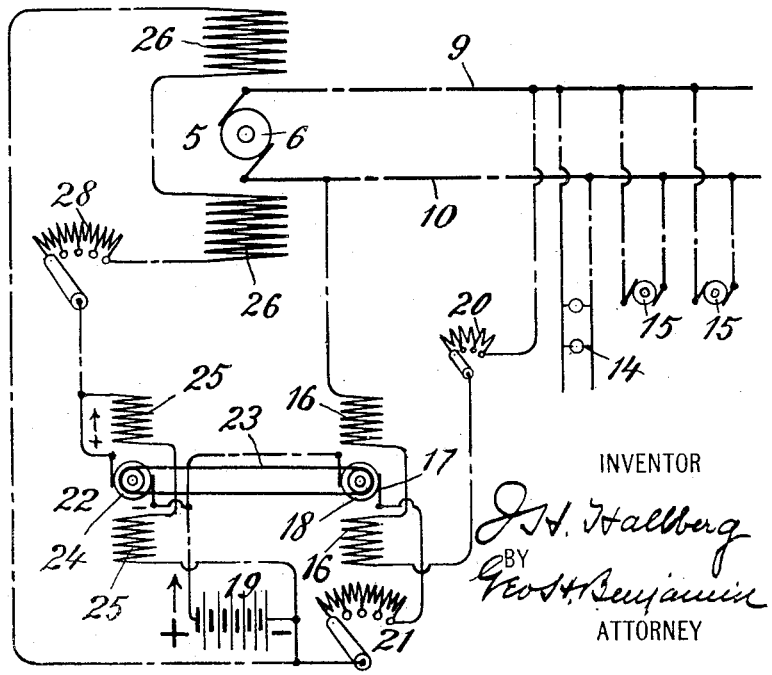

Figure 1 shows my improved system of electrical distribution and regulation as applied to an electric railway; Fig. 2, as applied to the distribution of light and power and involving the employment of what is known as a "booster" for the exciting-current for the field-magnets of the main generator.

In the diagrams, 5 indicates a main generator, in the present case a direct-current generator, which in Fig. 1 is shown as having its armature 6 connected across the main feeder-conductor 7 and rails 8 and in Fig. 2 across the outgoing conductor 9 and return-conductor 10.

In Fig. 1, 11 indicates a contact or working conductor connected to the feeder-conductor, and 12 a car on the rails, carrying the usual contact-trolley 13.

In Fig. 2, 14 indicates a light-circuit, and 15 motors connected across the conductors 9 10.

Connected across the feeder-conductor 7 and rails 8, Fig. 1, or the outgoing and return conductors 9 10, Fig. 2, are the field-magnets 16 of a motor 17, whose armature 18 is connected across the terminals of a source of constant potential 19, which may be a battery, as shown, a storage battery, a dynamo, or any suitable source of constant-potential energy.

Arranged in the circuit of the field-magnets 16 is a variable resistance 20 and in the circuit of the armature 18 a variable resistance 21.

22 indicates a small generator, in the present case a direct-current dynamo of the shunt type, which is driven from motor 17 by means of a belt 23 or any other suitable power-transmission means. The dynamo 22 has its armature 24 and field-magnets 25 connected across the terminals of the field-magnets 26 of the main generator 5.

27 is a variable resistance connected in the circuit of the field-magnets of the small generator 22, and 28 a variable resistance connected in the circuit of the field-magnets 26 of the main generator 5.

In Fig. 2 the field-magnets 25 of the small generator 22 and the field-magnets 26 of the large generator 5 are shown as connected across the terminals of the source of constant-potential energy 19.

In Fig. 1 the field-magnets 26 of the large generator 5 are excited by the current from the small dynamo 22 and in Fig. 2 by the current from the source of potential 19 and from the small dynamo 22.

The operation of my improved system of distribution is as follows: Under normal conditions the motor 17, by reason of the current energy derived from the source of constant potential 19, is driven at the required speed to enable the small dynamo 22, which is driven by it, to produce the required current necessary to effect the normal excitation of the field-magnets 26 of the generator 5. The speed of the motor 17 may be regulated through the instrumentality of the resistance devices 20 21 and the excitation of the field-magnets 25 of the small dynamo and the field-magnets 26 of the main generaters through the resistance devices 27 28. Should the work in the distributing-circuit from the main generator 5 exceed a predetermined amount, the potential in such circuit will drop and less current will traverse the field-magnets 16 of the motor 17, and as a consequence the armature 18 of the motor will move at a greater speed, thereby rotating the armature 24 of the small generator 22 at a greater speed and increasing the current transmitted through the field-magnets 26 of the generator 5, with the result that the excitation of these magnets will be increased and the potential in the current in the distributing-circuit again brought to the normal. When the work in the distributing-circuit is decreased, the reverse takes place.

In Fig. 2 the operation is the same, with the exception that when the work is increased in the distributing-circuit the current from the small generator 22 is increased and added to the current from the source of constant potential 19 fed to the field-magnets 26 of the generator 5, and, conversely, when the work is decreased the current from the small generator 22 is gradually cut down as the speed of the small generator is decreased.

I wish it understood that I do not limit myself to the particular apparatus shown in the two diagrams for regulating the current fed to the field-magnets of the main generator, as it will be evident to those skilled in the art that the motor device energized and connected as shown may be employed to control through many different devices the current required to produce the necessary excitation of the field-magnets of the main generator.

Having thus described my invention, I claim—

1. A system of electrical distribution comprising a generator, a distributing-circuit, a motor having its field-magnets connected across the distributing-circuit, a source of constant potential connected across the armature of said motor, and means controlled by the speed of the motor for varying the excitation of the field-magnets of the generator to maintain the potential of the current in the distributing-circuit constant.

2. A system of electrical distribution comprising a generator, a distributing-circuit, a motor having its field-magnets connected across the distributing-circuit, a source of constant potential connected across the armature of said motor, a shunt-wound dynamo connected across the field-magnets of the generator, and power-transmission means interposed between the armature of the motor and the armature of the shunt-wound dynamo.

3. A system of electrical distribution comprising a generator, a distributing-circuit, a motor having its field-magnets connected across the distributing-circuit, a source of constant potential connected across the armature of the motor, a small generator of electricity for exciting the field-magnets of the main generator connected to the distributing-circuit, and power-transmission means interposed between the armature of the motor and the armature of said small generator.

4. A system of electrical distribution comprising a generator, a distributing-circuit, a motor having its field-magnets connected across the distributing-circuit, a source of constant potential connected across the armature of said field-magnets, a small generator for exciting the field-magnets of the large generator, power-transmission means interposed between the motor and the small generator, and means for manually varying the speed of rotation of the armature of the motor.

5. A system of electrical distribution comprising a generator, a distributing-circuit, a motor having its field-magnets connected across the distributing-circuit, a source of constant potential connected across the armature of said field-magnets, a small generator for exciting the field-magnets of the large generator, power-transmission means interposed between the motor and the small generator, means for manually varying the speed of rotation of the armature of the motor, and means for varying the resistance of the field-magnet circuit of the large generator.

6. A system of electrical distribution comprising a generator, a distributing-circuit, a motor having its field-magnets connected across the distributing-circuit, a source of constant potential connected across the armature of said field-magnets, a small generator for exciting the field-magnets of the large generator, power-transmission means interposed between the motor and the small generator, means for manually varying the speed of rotation of the armature of the motor, and means for manually varying the resistance of the field-magnet circuit of the motor.

In testimony whereof I affix my signature in the presence of two witnesses.

JOSEF HENRIK HALLBERG.

Witnesses:
J. E. PEARSON,
FRANK O'CONNOR.